United States Patent
Santangelo et al.

(10) Patent No.: US 12,231,618 B2
(45) Date of Patent: Feb. 18, 2025

(54) SYSTEM AND METHOD TO TEST TELEVISION DEVICE

(71) Applicant: Communications Test Design, Inc., West Chester, PA (US)

(72) Inventors: Aaron Santangelo, Wayne, PA (US); Christian Cote, Philadelphia, PA (US); Srinidhi Ramesh, Media, PA (US); Nannam Simla, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 88 days.

(21) Appl. No.: 18/163,473

(22) Filed: Feb. 2, 2023

(65) Prior Publication Data
US 2024/0267508 A1 Aug. 8, 2024

(51) Int. Cl.
*H04N 17/00* (2006.01)
*G06T 7/00* (2017.01)
*G06T 7/13* (2017.01)
*G06T 7/20* (2017.01)
*G06T 7/70* (2017.01)
*G06T 7/90* (2017.01)
*H04N 9/67* (2023.01)
*H04N 17/02* (2006.01)

(52) U.S. Cl.
CPC ......... *H04N 17/004* (2013.01); *G06T 7/0004* (2013.01); *G06T 7/13* (2017.01); *G06T 7/20* (2013.01); *G06T 7/70* (2017.01); *G06T 7/90* (2017.01); *H04N 9/67* (2013.01); *H04N 17/02* (2013.01); *G06T 2207/30241* (2013.01); *H04N 2017/006* (2013.01)

(58) Field of Classification Search
CPC ...... H04N 17/004; H04N 17/00; H04N 17/04; H04N 17/02; H04N 9/67; H04N 2017/006; G06T 7/13; G06T 7/90; G06T 7/70; G06T 7/20; G06T 7/0004; G06T 2207/30241
USPC ................................ 348/182, 180, 184, 189
See application file for complete search history.

(56) References Cited

U.S. PATENT DOCUMENTS

| | | | |
|---|---|---|---|
| 4,963,828 A * | 10/1990 | Kawame | G01R 31/257 348/180 |
| 9,552,753 B1 | 1/2017 | Sivertsen | |
| 2002/0185395 A1 | 12/2002 | Lindamood | |
| 2007/0285578 A1 | 12/2007 | Hirayama et al. | |
| 2009/0085847 A1 | 4/2009 | Morisue et al. | |
| 2009/0122132 A1 | 5/2009 | Thielman | |
| 2013/0141593 A1 | 6/2013 | Bassi et al. | |
| 2015/0140986 A1 | 5/2015 | Lamb et al. | |

OTHER PUBLICATIONS

International Search Report and Written Opinion issued for corresponding PCT International Application No. PCT/US2024/010742 dated Jun. 13, 2024, 13 pages.

* cited by examiner

*Primary Examiner* — Sherrie Hsia
(74) *Attorney, Agent, or Firm* — Bradley M. Brown

(57) ABSTRACT

A test system includes a computer system including a processor and a memory; and an electronic interface in communications with the computer and a television device under test, the electronic interface including a test interface board configured to permit the television device under test to be put into a debug mode by the computer system.

10 Claims, 3 Drawing Sheets

SYSTEM AND METHOD TO TEST TELEVISION DEVICE

BACKGROUND

The present disclosure relates to electronic device testing. More specifically, the present disclosure relates to a system and method to automate functional testing of a digital television.

Testing television (TV) devices to detect functional defects requires an operator performs a series of manual testing steps including (i) verifying an image shown on the TV's display to be clear, uniform, and without visual defects when displaying a series of colors and patterns; (ii) confirming audio played from the TV's speakers and audio output jacks provides a clear and undistorted signal; (iii) confirming a response when speaking a command into the TV's microphone; (iv) confirming the TV responds appropriately to a signal from a remote control; (v) visually confirming the color and brightness of indicator lights; (vi) interfacing with buttons or switches and confirming visual verification of the TV's response; and (vii) interaction with the TV's electrical interface to verify functional connectivity and operation of antenna/cable demodulation, audio-visual inputs and outputs, network communications (e.g., Ethernet), near field communications (e.g., Wi-Fi, Bluetooth, etc.).

Manual testing operations and functionality of the features listed are prone to human errors such as missing a defect during a visual or auditory inspection, mistaken input leading to an unintended result, operator malfeasance, and errors due to improper operator training.

These errors can result in defective devices being sold into the market as non-defective devices. This can lead to providers and consumers having to pay in terms of cost of returns and replacement and inconvenience that can diminish customer confidence in the product and/or manufacturer.

Additionally, these errors can also result in non-defective devices being treated as defective devices. Devices that are incorrectly identified as defective can be sent to repair, resold for a lower cost, or scrapped entirely. These situations can result in a financial loss for TV manufacturers and sellers.

In addition to human errors, the manual process makes it difficult to generate an audit trail. A lack of audit trail results in operator unaccountability and an inability to recheck the data from defective/non-defective devices.

Moreover, manual testing is reliant on operator labor which is expensive, scarce, and difficult to scale in production.

SUMMARY OF THE DISCLOSURE

The present disclosure describes a system and method to automate TV device testing that requires minimal operator interaction to perform a complete functional test of a TV's features. This results in reducing (i) operator errors and inconsistency; (ii) the time required to perform the testing sequence, thereby increasing throughput from each test station, and allowing for fewer test stations; (iii) operator labor to process a same number of TV devices; and (iv) costs of employment and scaling production. Additionally, the disclosed automation permits automatic creation of a reliable audit trail for each test performed for each tested TV device.

To overcome the problems described above, embodiments of the present disclosure include a test system, including a computer system including a processor and a memory; and an electronic interface in communications with the computer and a television device under test, the electronic interface including a test interface board configured to permit the television device under test to be put into a debug mode by the computer system.

In an aspect, the electronic interface is configured to communicate with the television device under test to initiate firmware updating and testing of the television device under test.

In an aspect, the test interface board is used to unlock the television device under test with a cryptographic key.

In an aspect, the computer system is connected to the television device under test via an Ethernet port and is configured to issues diagnostic commands to the television device under test via the Ethernet port.

In an aspect, the computer system is configured to communicate with the television device under test to obtain unique identification information of the television device under test.

In an aspect, the test system includes at least one of a camera, a microphone, a speaker, and a motion source.

In an embodiment, a method of testing a television device includes providing a television device; displaying a white image on a display of the television device; capturing a digital image of the white image; determining an outline of the display using an edge detection algorithm applied to data of the digital image of the white image to determine a location of the display; displaying a test pattern on the display; capturing a digital image of the test pattern; masking data of the digital image to determine the elements of the data of the digital image used to analyze the test pattern.

In an aspect, the test pattern is a full-field color.

In an aspect, masking the data of the digital image includes: converting red, green, and blue (RGB) pixel data into hue, saturation, and value (HSV) data, comparing the HSV data to a predetermined threshold, disregarding HSV data that is outside of the predetermined threshold.

The method can further include comparing a number of bad pixels of the test pattern to a threshold number of bad pixels to determine acceptance of the television device.

In an aspect, the method further includes: generating an audio signal by the computer; playing the audio signal by a speaker; and detecting the audio signal by a microphone of the television device.

In an aspect, the method further includes: outputting an infrared (IR) signal from an IR port of the television device based on a command by the computer; receiving the IR signal by an IR device in communications with the computer; analyzing the IR signal by the computer.

In an aspect, the method further includes: the command is output from the IR device.

In an aspect, the method further includes: commanding the television device to display a white field; capturing a digital image of the white field at a minimum backlight level of the television device and at a maximum backlight level of the television device; analyzing the digital images to determine if the digital images have pixels that satisfy threshold value conditions.

In an aspect, the method further includes: commanding the television device to display a moving object in a racetrack pattern; capturing digital images of the moving object at different locations on the television device; determining location coordinates of the moving object for each of the captured digital images; and analyzing the location coordinates to determine if the moving object is following an expected path.

In an aspect, the method further includes: setting an object in motion; and detecting if a motion sensor of the television device has detected the motion.

In an aspect, the method further includes: flashing a firmware image file to the television device.

In an embodiment, a non-transitory computer-readable medium includes executable instructions that when executed by a processor cause the processor to transmit a cryptographic key to a television device to place the television device into a debug mode.

In an aspect, the non-transitory computer-readable medium causes the processor to issue a diagnostic command to the television device to test a feature of the television device.

In an aspect, the non-transitory computer-readable medium causes the processor to flash an image file to the television device.

In an embodiment, an automated test system for a display device, includes an enclosure configured to receive the display device, wherein the enclosure is further configured to provide a dark room environment; a first component set including: a camera; a microphone;

a speaker; an IR emitter; and a motion source, wherein each member of the first component set is within the enclosure; a second component set including: an HDMI splitter module; an audio analyzer; an audio switch; an RF modulator; and a digital to analog converter; and a computer system including a processor, a memory, and a monitor, the computer system including a graphical user interface, wherein the computer system is operatively connected to each of the members of the first component set and to each of the members of the second component set, and the computer system transmits one or more control signals to at least one of the members of the first component set to test the display device.

In an aspect, the automated test system further includes an electronic interface operatively connected to the computer system and to the display device, the electronic interface including a test interface board configured to permit the display device to be placed in a debug mode by the computer system.

The above and other features, elements, characteristics, steps, and advantages of the present invention will become more apparent from the following detailed description of preferred embodiments of the present invention with reference to the attached drawings.

DETAILED DESCRIPTION

Figure 1:
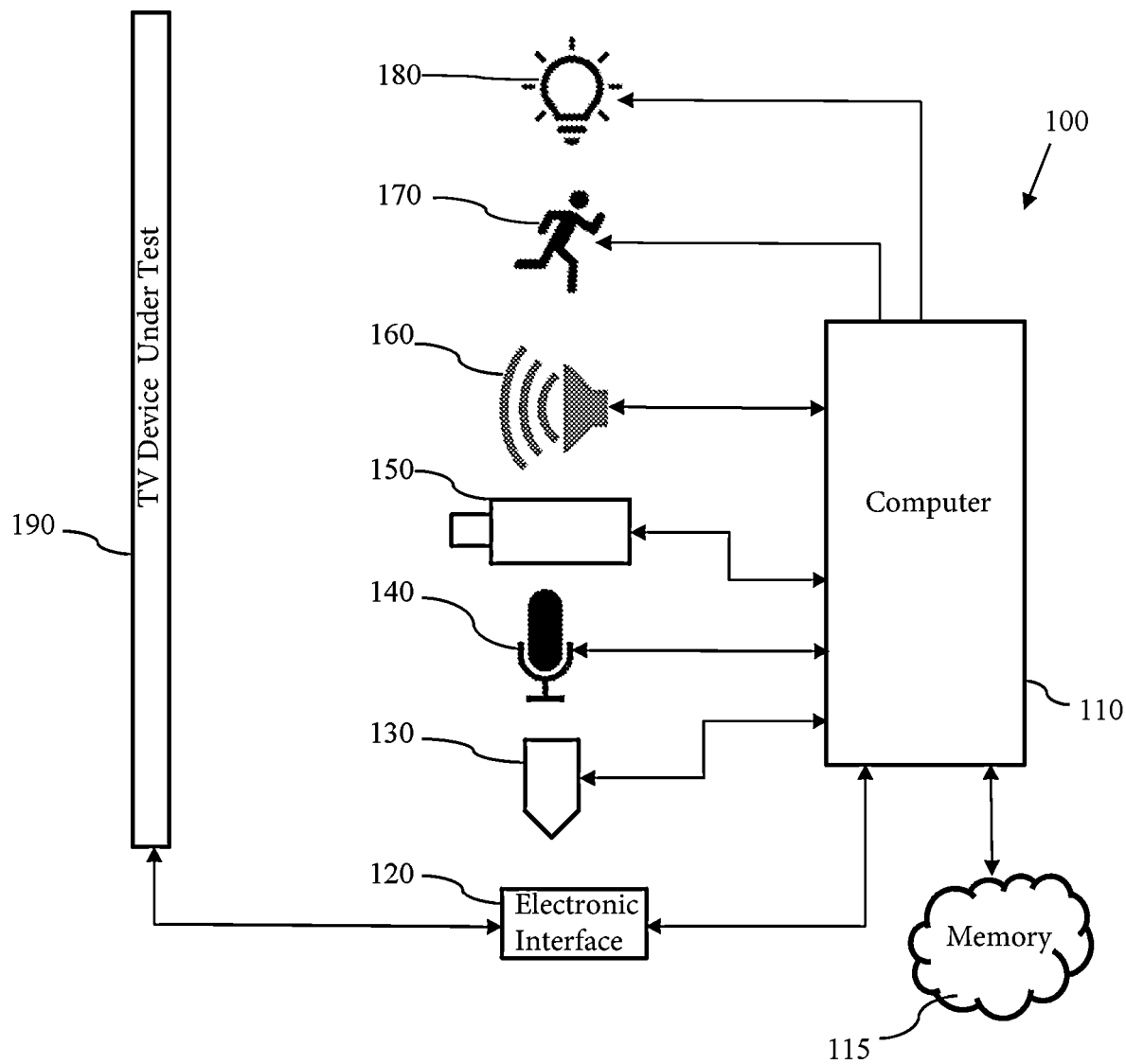
FIG. 1 is a block diagram overview of a system to test a TV device under test according to an embodiment of the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

With respect to a TV device under test, the disclosed system and method can be used, but not limited, to: (i) detect boundaries of the TV screen; (ii) command the TV to display patterns and colors for defect detection; (iii) capture an image of the TV screen to perform display analysis; (iv) detect light emitted from the TV's indicators; (v) switch audio/visual input signals to test each port; (vi) play, record, and analyze audio signals played from the TV's output ports and speakers; (vii) command the TV to perform a near-field communication scan and verify nearby devices are detected; (viii) output audio and video test signals to the TV using a radio frequency (RF) modulator and/or digital audio/visual output standard; (ix) output audible commands; and (x) perform on board diagnostics/built-in self-tests, gather device hardware and configuration information and update the device firmware and configuration as allowed by the TV device manufacturer.

A TV device being an electronic system of communicating transient images of fixed or moving objects together with sound to a user based on input that has been broadcasted wirelessly or transmitted to the TV device by wire from a source. The TV device including an enclosure or chassis, a display screen, a speaker, and electronics that receives electrical signals and changes them into images and sound.

The disclosed system and methods can be used for testing functionality of the TV device under test, for example, such as: testing the display screen by capturing one or many video image test patterns using a camera vision system and analyzing the captured images using appropriate image processing algorithms; testing the speakers by capturing one or many audio test patterns using a microphone and analyzing the captured audio using appropriate signal processing algorithms; testing the infrared (IR) input and/or output by simulating a remote control signal and observing a response; testing the audio/video inputs by providing a test signal and observing the video on the display screen using the camera vision system and the audio using the microphone; testing the audio outputs by providing a test signal through an input and capturing the audio output using a capture device; testing a microphone by providing an audio signal and observing a response; testing near-field communications by transmitting a command and observing connection to a nearby device; testing a network connection by sending and receiving commands via a network; and testing communication ports such as USB by performing a data transfer to and from an external storage device and verifying the data transfer speed and stability.

The system and method of the present disclose puts the TV device under test in a debug mode, which permits control of the TV device under test via a series of commands to execute certain test functions. Alternatively, the interface with the TV device under test can be performed through the User Interface (also called User-based testing). In such a case, an IR transmitter can be used to send commands to navigate the User interface, and the disclosed system can be used to observe and capture the response of the TV device under test and assist in the navigation of control functions. All user-accessible features, such as switching input ports, near-field communications, etc., can be selected and tested. It should be understood that both methods of testing (command-based and User-based) are possible as disclosed herein.

FIG. 1 is a block diagram overview of a system 100 to test a TV device under test 190 according to an embodiment of the present disclosure. FIG. 1 shows that the system 100 can include a variety of hardware devices or components to interact with the TV under test 190. The hardware components can include a computer 110 connected to a memory 115 to store test results, an electronic interface 120 to various inputs and outputs of the TV device under test 190 that combines, converts, or selects between the various outputs of the TV device under test 190 to make them readable by the computer 110, and splits, copies, or converts the outputs from the computer 110 to make them readable by the TV device under test's inputs, an infrared signal emitter and/or receiver device 130, a microphone 140, a camera 150, a speaker 160, a source of motion 170, and a light source 180. The system 100 and device under test 190 can be located within a test space such as an enclosure or dark room environment. The components of the electronic interface can be located inside the test space or mounted on a mobile support, or cart, to optimize and simplify the wiring between the TV device under test 190 and the system 100. The infrared device 130, the microphone 140, the camera 150, and the speaker 160 can be multiple devices. For example, the camera 150 can be an array of individual cameras each detecting a portion of the TV device under test 190. Likewise, the microphone 140 and the speaker 160 can be an array thereof to provide better sound measurement or positional information.

The computer 110 can include a processor and a memory 115 for storage. The computer can be a stand-alone personal computer or central processing unit or a decentralized network of computers. Although not shown, the computer can include a monitor and user input interface such as a keyboard, mouse, trackball, barcode reader, touch screen, and the like. Optionally, the memory 115 can be separate from the computer 110 and can be part of a network or in the cloud. The memory 115 can include storage of a test application for an operator to interface with the system 100 via the computer 110. The test application can include a graphical user interface (GUI) to instruct/allow an operator to perform tasks including plugging or unplugging test cables, start and/or stop a testing sequence or individual test, monitor in real time a particular test and the test results, and store test results.

The computer 110 can interface with a remote database on the memory 115 to store test results. A device unique identifier (e.g., Device Serial Number) can be read from the device under test 190, either directly using a barcode scanner, or via a diagnostic command, and is used to associate the test results with a specific device. The test results can include Pass/Fail status, failure code for the specific failure, test time, and additional test information collected during testing, such as command responses or measured values.

Figure 2:
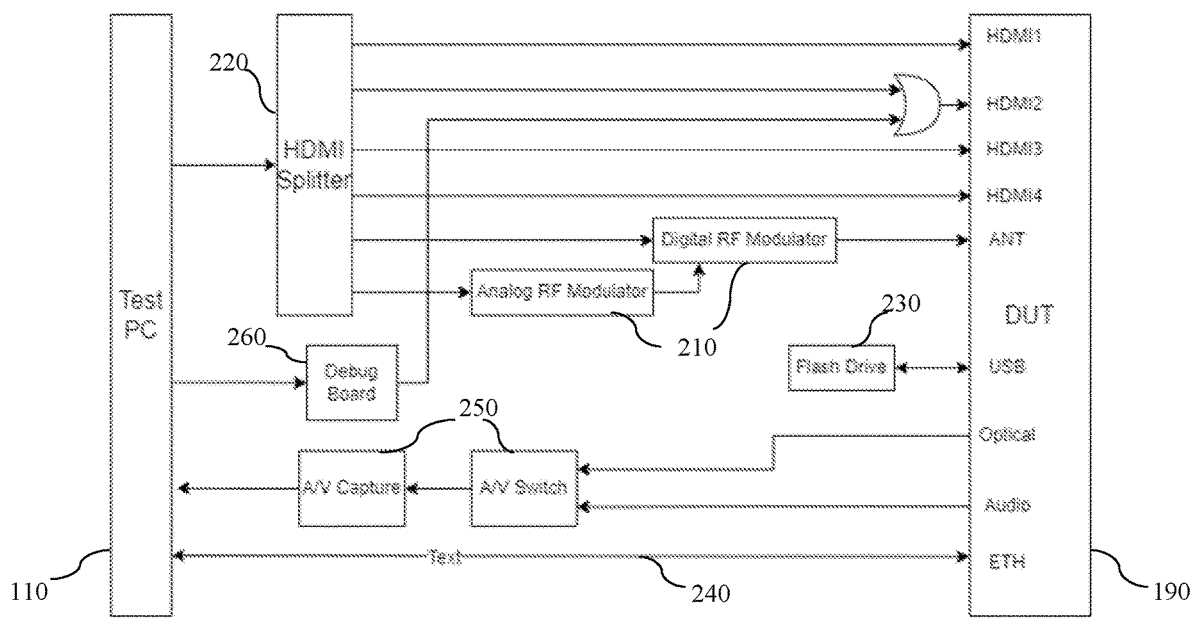
FIG. 2 illustrate a wiring diagram between a test system and a TV device under test according to an embodiment of the present disclosure.

The electronic interface 120 can include a variety of components and cabling to provide an interface between the computer 110 and the TV device under test 190. FIG. 2 is a block diagram illustrating exemplary interfaces between the computer 110 (Test PC) and ports of the TV device under test 190 (DUT). Such components and cabling can include a RF modulator 210 to provide an input signal to the TV's coaxial/antenna and/or analog input, an audio/visual splitter 220 and/or switcher to provide input to the TV's digital inputs (e.g., HDMI, display port, etc.), a storage drive 230 or accessory connection to a universal serial bus (USB) port, a direct connection 240 to an Ethernet or other network interface (i.e., LAN, WAN, etc.); a direct connection to or from a digital audio input and/or output, direct connection to other audio/visual input or output ports such as component video, RGB video, and the like (not shown). The electronic interface 120 can also include a digital-to-analog converter (DAC) to convert digital audio output from the TV device under test 190 to analog for recording. The electronic interface 120 can also include an audio analyzer 250 to analyze audio recorded by the microphone 140 and audio output ports of the TV device under test 190. The electronic interface 120 can also include a test interface (debug) board 260 or custom interface to a specific TV device under test 190 in order to put the TV device under test 190 into a debug mode or test unique features. The test interface board 260 can communicate to the TV device under test 190 for various functions, such as used to initiate firmware flashing and booting to specific modes (i.e., debug mode or user mode). Different TV device manufactures may also have a similar device specific to their TV devices required for communication to perform certain functions used in the testing process. For example, connection to the TV device under test 190 can be via USB, Ethernet, wireless communication, etc. The test interface board can be provided by an original equipment manufacturer (OEM) of the TV device under test 190, as off-the-shelf by a third party vendor, or custom made.

The infrared device 130 can be a transmitter and/or receiver and used as an interface between the computer 110 and an infrared port of TV device under test 190. For example, the infrared device 130 controlled by the computer 110 can effectively simulate a remote control. It is expected that the TV device under test 190 includes an IR IN (for control by a remote control device), but it can have an IR OUT. This can be used to test a loopback where the TV device under test 190 generates its own IR out, which is fed back to the IR IN. However, other TV devices under test can have IR IN fed back to IR OUT, or a discrete IR IN and IR OUT.

The microphone 140 can be used to capture audio emitted from a speaker(s) of the TV under test 190.

The camera 150 can be a digital camera or sensor used to capture images of the display screen of the TV device under test 190. The camera 150 can also be used to capture images of indicator lights on the TV device under test 190. For example, indicator lights can be LED's or other devices that indicate if a TV device under test 190 is powered off, powered on, in a stand-by state, muted, or providing an indication of other functionality.

The speaker 160 can be used to output audio to be detected by a microphone on the TV device under test 190. For example, the speaker 160 can be used to issue a voice command to the TV device under test 190 as another way of navigating the user interface as another alternative to using the IR port or remote control.

Figure 3:
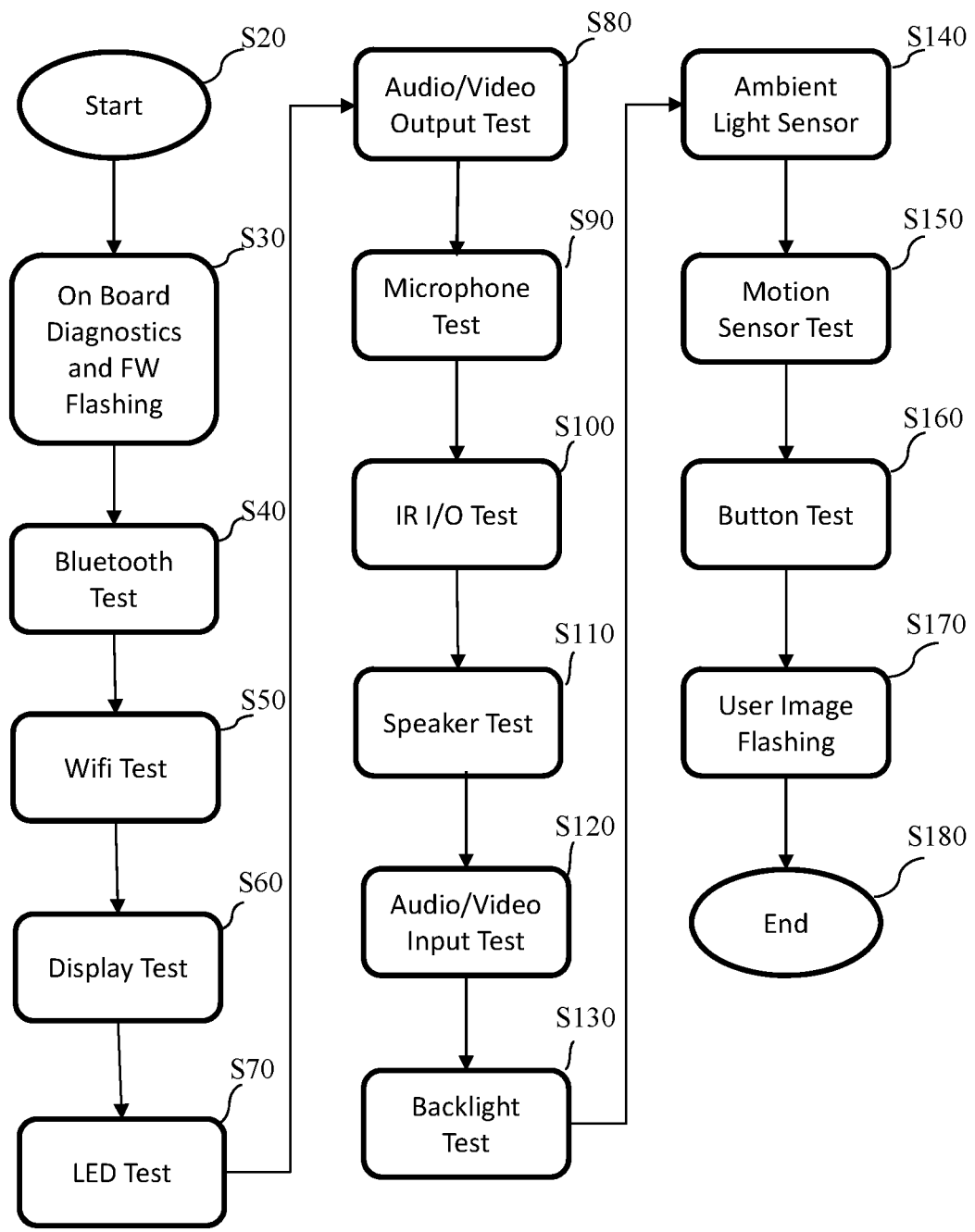
FIG. 3 is a flow chart of tests that can be performed by a test system on a TV device under test according to an embodiment of the present disclosure.

FIG. 3 is a chart of an exemplary testing flow of a method of testing a TV device under test according to an embodiment of the present disclosure. Some of the steps shown in FIG. 3 can be omitted or the order changed for testing a specific TV device under test. Some TV devices may not include features described in the testing flow. Once an operator positions a TV device under test 190 into the testing enclosure or environment and performs all of the relevant connections between the computer 110 and the TV device under test 190, the testing can start at step S20 where the operator can initiate the test application on the computer 110 of the system 100 via the GUI and input identification information for the TV device under test 190. The identification information can include, for example, a TV device manufacturer, model, and serial number.

At step S30, the test system 100 can initiate a firmware updating and diagnostic flashing process of diagnostic firmware. The diagnostic firmware is used to read and validate stored values or perform manufacturer-specific internal tests of TV devices under test. The onboard diagnostics can be initiated via communication through the Ethernet connection to the TV devices under test or be performed wirelessly over Wifi, Bluetooth, through another connection such as a serial port or a manufacturer-specific test interface board connected to one of the TV device's inputs, such as an HDMI port. In an embodiment, using the Test interface board, the TV device under test 190 can be put in a debug mode, which can include unlocking the device using a cryptographic key that can be input via the computer 110 or any other suitable method. The TV device under test 190 can be commanded to update its internal firmware by transferring into internal onboard non-volatile memory (i.e., flashing) a firmware image file stored on a properly configured USB storage device connected to the devices USB input port. Once the firmware flashing is complete, the TV device under test 190 is restarted and additional diagnostic commands can be issued through the Ethernet port from the computer 110 for further testing of internal resources and features such as sensors, data buses, electronic components, etc. In an embodiment, the firmware updating and diagnostic flashing process can be performed using on-screen-display or self-diagnostic menus and downloaded via a communications link such as WiFi or Ethernet.

During this step, the test system 100 can poll the TV device under test 190 to obtain unique device identification information (e.g., device serial number (DSN), model, media access control (MAC) address, etc.). This data can be saved in the memory 115 as a portion of the test record for an individual TV device under test 190.

At step S40, the test system 100 can initiate a test of a nearfield communication (i.e., Bluetooth Test) function by instructing the TV device under test 190 to detect a nearby device. For example, the TV device under test 190 can be commanded to connect to the computer 110 via Bluetooth. The TV device under test 190 can detect this signal and indicated that the Bluetooth is an available connection to pass the test.

At step S50, the test system 100 can initiate a test of a wireless network connection (i.e., WiFi Test) function by instructing the TV device under test 190 to detect a nearby network. For example, the TV device under test 190 can be commanded to connect to a local network via WiFi. The network can be outside of the test enclosure, or a wireless access point or a router can be part of the test electronics 120. The TV device under test 190 can detect this signal and indicated that a WiFi network is available to pass the test.

At step S60, the test system 100 can initiate a display test. The camera 150 interfaced to the computer 110 (i.e., vision system) can be used to perform automated visual testing of the TV device under test 190. For example, the camera 150 can be used to automatically find edges of the display screen to determine where the display is in the camera's field of view using an edge detection algorithm. This is necessary because the position of the TV device under test 190 can vary in the testing environment. Edges can be found by displaying a full white screen on the TV device under test 190 in a dark ambient. This creates an outline of where the region of interest is (in this case, where the screen is located). In addition, the edge detection algorithm provides consistency in both pass/fail cases by eliminating uninterested regions outside of the display screen.

Finding the position of the TV device under test 190 within the camera field of view/image allows the machine vision algorithm to be more flexible. The camera 150 can detect displayed patterns and colors, and analyze captured images to detect display or video defects. For example, the display of the TV device under test 190 can show various full-field colors and patterns. The colors and test patterns can be provided by using computer-generated test patterns that are transmitted to the TV device under test 190 via the video inputs (HDMI, Antenna, RCA, etc.), by using built-in test patterns that are stored in the TV device under test 190, or a combination of the two image sources. The camera 150 can capture digital images of the individual colors and patterns which can be analyzed by the computer 110 using image processing techniques to detect non-uniformities and bad pixels.

Full-field colors and test patterns can be analyzed by masking. Masking is an image processing method of indicating which elements of a matrix or a vector string of digital image data should and should not be used to analyze the color or test pattern. Here, red, green, and blue (RGB) digital data captured by the camera is converted to the hue, saturation, and value (HSV) color model. Criteria of ranges of HSV values for each of the test patterns and colors are experimentally determined. The masking algorithm then disregards any HSV values that is out of the defined range, meaning that if a red color is being tested, data values that are not red will be disregarded. Threshold numbers of bad pixels are used to define pass/fail criteria and compared to how many bad pixels are detected.

At step S70, the test system 100 can initiate an indicator test (i.e. LED Test) to verify proper function of visual indicators that can be activated on the front surface of a chassis or bezel surrounding the display of the TV device under test 190. Various indicator lights can be provided in the TV device under test 190 that can be lit or unlit to indicate a state of particular TV functions. For example, functions can include whether the TV device under test 190 is powered on or off, is in a stand-by state, or is muted. The indicators can be light-emitting diodes (LEDs) or use another lighting scheme. The indicators can be different colors to indicate different states or functions. The TV device under test 190 can be put into different states in which visual indicators are expected and the camera 150 interfaced to the computer 110 can be used to perform automated visual testing of the TV device under test 190. For example, in some TV devices under test 190 a set of test commands can be used to control the various diagnostic states. Other TV devices under test 190 can have different user functions that would correspond to the various indicator states. Once in a particular state, the vison system of the camera 150 and the computer 110 can capture an image of the front surface of the TV device under test 190. An image processing algorithm can be used to determine the state of the indicators. The specific algorithm (image compare) could change depending on what is being analyzed.

At step S80, the test system 100 can initiate an audio/video output test to verify functionality of output audio and video ports on the TV device under test 190. The audio and video ports can include analog ports (e.g., RCA, component, s-video, VGA) and digital ports (e.g., optical, HDMI, DVI, Display Port) or any combination thereof. The audio and video output ports can be tested by transmitting an image and/or sound signal from the TV device under test 190 through an audio and/or video port and capturing the audio and/or video signal into the computer 110 using an Audio/Video Capture device 250, combined with appropriate signal conversion and switching circuitry 250. The captured audio signal and/or image is analyzed by the computer 110. The analysis of the audio signal can include sound level (i.e., volume), frequency, distortion, noise level, or any other measurement of the sound quality that can be derived from a sampling of the output sound. The analysis of the video image can be performed by comparing the captured image with an expected reference image, or by analyzing the image for color accuracy, brightness, noise, artifacts, or any other measure of image quality that can be derived from a sampled video image.

At step S90, the test system 100 can initiate a microphone test to verify functionality of a microphone on the TV device under test 190. For example, the computer 110 can generate an audio test signal that is played via the speaker 160. The audio signal can be detected by the microphone in the TV device under test 190. In an embodiment, the detected audio signal can be feedback to the computer 110 and analyzed, similar to what is described above. In an embodiment, the microphone can be tested by issuing an audible command through the speaker 160 and verifying that the TV device under test 190 responds appropriately to the command. In another aspect, a built-in or downloaded user application can be used to access the microphone on the TV device under test 190 and analyze the response.

At step S100, the test system 100 can initiate an IR port input/output test (IR I/O Test) to verify functionality of the IR port of the TV device under test 190. The input of the IR port can be tested by sending an IR signal via the IR device 130 to the IR port of the TV device under test 190. The output of the IR port can be tested by commanding the TV device under test 190 to generate a signal to be output from the IR port that can be received by the IR device 130 and analyzed by the computer 110. The signal received by the IR device 130 can be analyzed to verify it matches the expected data content and/or signal strength. The signal sent by the IR device 130 can be verified by confirming the TV device under test 190 responds in an expected manner appropriate for a command sent.

In an embodiment, an IR Out command is loopback to the IR In, and if the same command that was sent out is detected at IR IN, then both IR OUT and IR IN must be properly functioning. In the case where IR Out and IR In are tested separately, a TV command can be sent using the IR transmitter 130, and if the TV device under test 190 responds to the IR command as expected, then the IR In port must be properly functioning. The TV device under test 190 can then issue an IR Out Command (by default mirroring of IR IN to IR Out, through a setting or other command to the TV device under test 190). This IR Out command can be detected by the IR receiver 130. If the correct command is received, then the IR Out port of the TV device under test 190 must be properly functioning.

At step S110, the test system 100 can initiate a speaker test to verify functionality of the speakers of the TV device under test 190. Each speaker can be tested by playing, recording, and analyzing an audio signal from that speaker. For each speaker under test, a test signal is generated by the computer 110 and provided via one of the audio/video inputs (e.g. HDMI). The test signal generated by the computer 110 targets a specific speaker. For example, the test signal can target a single channel in a multi-channel audio stream, such as left channel to test the left speaker. The test signal can consist of one or more frequencies that excite the specific speaker and provide the ability to measure the audio response of the speaker (i.e., the volume level, distortion, noise, etc.) via the microphone 140 and analyzed by the computer 110.

At step S120, the test system 100 can initiate an audio/video test (Audio/Video Input Test) to verify functionality of digital and analog audio/video ports of the TV device under test 190. Each audio/visual port can be tested by sequentially inputting an audio/video signal into each of the audio/video ports and using the camera 150 to analyze the displayed video and the speaker 160 to analyze the output audio. The video test signal can be analyzed in the same way as the display test in step S100, using the camera 150 to capture features (colors/patterns) shown on the display screen that can be analyzed by the computer 110. The audio test signal is analyzed in the same way as the speaker test in step S110. This is repeated for each input (e.g., 4x HMDI).

At step S130, the test system 100 can initiate a backlight test to verify functionality of the backlight of the display of the TV device under test 190. Although the backlight must be functioning at some level during the Display Test, the dimability, representative luminance range, and local dimming can be tested separate from the Display Test. The backlight can be tested by turning on the display, displaying a white field, and using the camera 150 to analyze the light output. Light output can be analyzed by capturing a digital image of the white field that is displayed on the TV device under test 190 at both maximum and minimum backlight levels. The maximum and minimum values can be initiated, for example, by a command or using an on-screen-display. The RGB values for each pixel of the camera images can be converted into the hue, saturation, value (HSV) color format to determine the S and V values for both backlight levels. Masking is applied using a predetermined cutoff threshold by inputting data for the images captured of the maximum and minimum backlight levels into an image processing function where conditions only allow a pixel that is bright enough to be identified. Pixels with S and V values below the threshold will be masked out. The function returns the images in black and white, where white pixels satisfy the cutoff conditions while black pixels do not satisfy the cutoff conditions and are filtered out. The data for the images of the maximum and minimum backlight levels are evaluated to see determine if the images have pixels that satisfy the conditions. To pass, the image for the minimum backlight level should have no white pixels detected because their S and V values are below the cutoff threshold. The image for the maximum backlight level should have white pixels detected because their S and V values are above the cutoff threshold.

Some TV devices utilize a "Local Dimming" technique to provide higher contrast. The local dimming functionality can be tested using a pattern or object that moves across the screen. In this portion of the backlight test, the computer 110 issues an on-board command to display a moving object, for example, a white ball that travels in a racetrack pattern around the display. The camera 150 is used to capture the moving object by taking multiple images at different locations on the screen. A masking technique is used to find the location coordinates (i.e., x and y) of the object for each image. The set of location coordinates for all images is analyzed to ensure that the moving object is present in each image and is located as moving following the expected path (i.e., racetrack pattern). The representative luminances of the object and the remainder of the screen are obtained by masking the object, are analyzed using a technique similar to the one described above, and compared to predetermined threshold values.

At Step S140, the Test System 100 can initiate an Ambient Light Sensor Test to verify the functionality of an Ambient Light Sensor. Test System 100 sends on-board commands to capture light level inside the chamber with the light off. Then Test System 100 turns on the light 180 and sends the commands to capture the light level inside the chamber with light on. The measured values with and without the light are compared to determine if the Ambient Light Sensor is functional.

At Step S150, the Test System 100 can initiate a motion sensor test, also called a room occupancy or presence detection, which can include two separate parts, a self-diagnostic test and a motion sensor test. The self-diagnostic test is an on-board commands Test System 100 issues onto the TV and results are sent back to the Test System 100. This can be included in Step S10. The motion sensor test uses a source of motion 170 within the chamber that can be detected by the sensor on the TV device under test 190. Depending on the type of sensor on the device (infrared or radar), the source of motion can be an object or target that is set in motion with a motor, or linear actuator, and can include a source of infrared, such as a lightbulb, infrared LED or other IR or heat source. The size of the object and the distance travelled are designed to be sufficient to trigger the motion sensor in the TV device under test 190. Test System 100 can issue a command to monitor the sensor and detect when the motion starts and stops. Alternatively, the test system 100 can monitor for the device response to motion, such as the device turning on/off automatically, adjusting the backlight, or another system response.

At step S160, the test system 100 can initiate a button test to verify functionality of buttons on the TV device under test 190. The GUI of the test system 100 can prompt an operator to initiate pressing certain buttons on the TV device under test 190. Reactions to the button pressing can be detected by the camera 150 and/or microphone 140 depending on the button's function, or using diagnostic commands to monitor the state of the button. For example, the camera 150 can be used to detect a change on the display of the TV device under test 190 from an on-screen menu, a video overlay, from powering off, or an LED coming on or off. Audio output, such as a sound or click for a speaker of the TV device under test 190, can be detected by the microphone 140, or some form of an onboard diagnostic feature controlled by the computer 110.

As part of the button test a step S180, the test system 100 can initiate a mute test (Mute Switch Test) to verify functionality of muting the TV device under test 190. The GUI of the test system 100 can prompt an operator to initiate muting the TV device under test 190 by pressing a mute button. Optionally, the IR emitter 130 can emit a command to mute the TV device under test 190. The microphone can 140 can be used to detect a volume of sound from the TV device under test 190 before and after muting the TV device under test 190. If not otherwise tested, the camera 150 can be used to detect whether or not a lit indicator associated with the muting function is actuated with the mute function.

At step S170, the test system 100 can exit the TV under test 190 out of the diagnostic or debug mode, and flash the firmware into a user mode. The TV device under test 190 can be commanded to update its internal firmware by transferring into internal onboard non-volatile memory (i.e., flashing) a firmware image file stored on a properly configured USB storage device connected to the devices USB input port. Once the firmware flashing is complete, the TV device under test 190 is restarted. In an embodiment, the firmware updating and diagnostic flashing process can be performed using on-screen-display or self-diagnostic menus and downloaded via a communications link such as WiFi or Ethernet.

Once the firmware flashing is completed, the camera 150 can be used to detect whether or not the TV device under test 190 is able to boot and show the appropriate user interface screen by comparing the image displayed on the TV device under test 190 to a static image. This ensures that the TV device under test 190 is in a state where it is ready for use prior to ending the test.

At step S180, the test system 100 can end the testing by saving the test results into a record on a computer memory or network-connected database such that the test results are associated with the identification information for the TV device under test 190.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:
1. A method of testing a television device, the method comprising:
provided a television device;
displaying a white image on a display of the television device;
capturing a digital image of the white image;

determining an outline of the display using an edge detection algorithm applied to data of the digital image of the white image to determine a location of the display;

displaying a test pattern on the display, wherein the test pattern is a full-field color;

capturing a digital image of the test pattern;

masking data of the digital image of the test pattern to determine the elements of the data of the digital image of the test pattern used to analyze the test pattern:

setting an object in motion; and detecting if a motion sensor of the television device has detected the motion.

2. The method of claim 1, further comprising masking the data of the digital image of the white image includes:

converting red, green, and blue (RGB) pixel data into hue, saturation, and value (HSV) data, comparing the HSV data to a predetermined threshold, disregarding HSV data that is outside of the predetermined threshold.

3. The method of claim 1, further comprising comparing a number of bad pixels of the test pattern to a threshold number of bad pixels to determine acceptance of the television device.

4. The method of claim 1, further comprising:

generating an audio signal by a computer;

playing the audio signal by a speaker; and detecting the audio signal by a microphone of the television device.

5. The method of claim 1, further comprising:

outputting an infrared (IR) signal from an IR port of the television device based on a command by a computer;

receiving the IR signal by an IR device in communications with the computer;

analyzing the IR signal by the computer.

6. The method of claim 5, wherein the command is output from the IR device.

7. The method of claim 1, further comprising:

commanding the television device to display a white field;

capturing a digital image of the white field at a minimum backlight level of the television device and at a maximum backlight level of the television device;

analyzing the digital image of the white field to determine if the digital image of the white field has pixels that satisfy threshold value conditions.

8. The method of claim 1, further comprising:

commanding the television device to display a moving object in a racetrack pattern;

capturing digital images of the moving object at different locations on the television device;

determining location coordinates of the moving object for each of the captured digital images; and analyzing the location coordinates to determine if the moving object is following an expected path.

9. The method of claim 1, further comprising flashing a firmware image file to the television device.

10. The method of claim 1, wherein masking the data of the digital image of the test pattern image includes:

converting red, green, and blue (RGB) pixel data into hue, saturation, and value (HSV) data, comparing the HSV data to a predetermined threshold, disregarding HSV data that is outside of the predetermined threshold.

* * * * *